United States Patent
Kurtz et al.

(10) Patent No.: US 8,644,146 B1
(45) Date of Patent: Feb. 4, 2014

(54) ENABLING USER DEFINED NETWORK CHANGE LEVERAGING AS-BUILT DATA

(75) Inventors: Matthew D. Kurtz, Altamonte Springs, FL (US); Shane A. Lobo, Jr., Orlando, FL (US); Brian D. Lushear, Winter Springs, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 664 days.

(21) Appl. No.: 12/848,818

(22) Filed: Aug. 2, 2010

(51) Int. Cl.
*H04J 1/16* (2006.01)

(52) U.S. Cl.
USPC ........ 370/231; 370/230.1; 370/252; 709/227; 709/228; 709/225

(58) Field of Classification Search
USPC .............. 370/230, 230.1, 231, 236, 237, 229, 370/252, 254, 255, 352, 389, 392, 400, 370/401; 709/227, 228, 220–225, 241, 248
See application file for complete search history.

(56) References Cited

U.S. PATENT DOCUMENTS

| | | | |
|---|---|---|---|
| 5,825,775 A | 10/1998 | Chin et al. |
| 5,898,826 A | 4/1999 | Pierce et al. |
| 6,046,988 A | 4/2000 | Schenkel et al. |
| 6,226,265 B1 | 5/2001 | Nakamichi et al. |
| 6,393,483 B1 | 5/2002 | Latif et al. |
| 6,570,867 B1 | 5/2003 | Robinson et al. |
| 6,650,347 B1 | 11/2003 | Nulu et al. |
| 6,700,967 B2 | 3/2004 | Kleinöder et al. |
| 6,788,697 B1 | 9/2004 | Aweya et al. |
| 6,792,273 B1 | 9/2004 | Tellinger et al. |
| 6,813,634 B1 | 11/2004 | Ahmed |
| 6,963,575 B1 | 11/2005 | Sistanizadeh et al. |
| 6,973,042 B1 | 12/2005 | Fitzgerald |
| 6,978,223 B2 | 12/2005 | Milliken |

(Continued)

OTHER PUBLICATIONS

Gonzalez, Jose, et al., "Integrated Network and Customer Database", U.S. Appl. No. 11/551,704, filed Oct. 21, 2006.

(Continued)

*Primary Examiner* — Hassan Phillips
*Assistant Examiner* — Ajay Cattungal

(57) ABSTRACT

A system is provided that receives a first change request from a first enterprise network device to a first configuration used by the first device, identifies components of the first configuration impacted by the first request, and receives a second change request from a second network device to a second configuration used by the second device. The system identifies second configuration components impacted by the second request, filters second device information from the second request and components impacted by the request, and analyzes the unimplemented first request impacting at least one component impacted by the second request. The system presents the as-built configuration of the second configuration, describes the first request impact to the component, approves all or some of the second request based on analysis of filtering results and a commitment regarding the first request, and processes the approved portion of the second request based on second device response.

20 Claims, 7 Drawing Sheets

(56) References Cited

U.S. PATENT DOCUMENTS

| | | |
|---|---|---|
| 7,016,301 B1 | 3/2006 | Moore |
| 7,099,305 B1 | 8/2006 | Fardid |
| 7,099,912 B2 | 8/2006 | Ishizaki et al. |
| 7,110,362 B2 | 9/2006 | Kato |
| 7,143,152 B1 | 11/2006 | Elman |
| 7,213,021 B2 | 5/2007 | Taguchi et al. |
| 7,225,139 B1 | 5/2007 | Tidwell et al. |
| 7,376,719 B1 | 5/2008 | Shafer et al. |
| 7,376,864 B1 | 5/2008 | Hu et al. |
| 7,424,526 B1 | 9/2008 | Hansen et al. |
| 7,464,152 B2 | 12/2008 | Ishizaki et al. |
| 7,467,225 B2 | 12/2008 | Anerousis et al. |
| 7,751,392 B1 | 7/2010 | Gonzalez et al. |
| 7,830,816 B1 | 11/2010 | Gonzalez et al. |
| 7,831,709 B1 | 11/2010 | Ham et al. |
| 7,869,432 B1 | 1/2011 | Mollyn |
| 7,904,533 B1 | 3/2011 | Gonzalez et al. |
| 7,904,553 B1 | 3/2011 | Ham et al. |
| 7,917,854 B1 | 3/2011 | Beaudoin et al. |
| 7,940,676 B2 | 5/2011 | Griffin |
| 7,983,174 B1 | 7/2011 | Monaghan et al. |
| 8,139,475 B2 | 3/2012 | Vercellone et al. |
| 8,289,878 B1 | 10/2012 | Gonzalez et al. |
| 8,301,762 B1 | 10/2012 | Lobo et al. |
| 8,355,316 B1 | 1/2013 | Lushear et al. |
| 8,458,323 B1 | 6/2013 | Baader, II et al. |
| 2002/0022985 A1 | 2/2002 | Guidice et al. |
| 2002/0078232 A1 | 6/2002 | Simpson et al. |
| 2002/0087393 A1 | 7/2002 | Philonenko |
| 2002/0101821 A1 | 8/2002 | Feldmann et al. |
| 2002/0103631 A1 | 8/2002 | Feldmann et al. |
| 2002/0103921 A1 | 8/2002 | Nair et al. |
| 2002/0164007 A1 | 11/2002 | Henits |
| 2002/0172148 A1 | 11/2002 | Kim et al. |
| 2002/0181047 A1 | 12/2002 | Lauder et al. |
| 2002/0186259 A1 | 12/2002 | Meandzija et al. |
| 2003/0051195 A1 | 3/2003 | Bosa et al. |
| 2003/0055972 A1 | 3/2003 | Fuller et al. |
| 2003/0145072 A1 | 7/2003 | Lau et al. |
| 2003/0152067 A1* | 8/2003 | Richmond et al. ............ 370/352 |
| 2003/0154404 A1 | 8/2003 | Beadles et al. |
| 2004/0006618 A1 | 1/2004 | Kasai et al. |
| 2004/0010496 A1 | 1/2004 | Behrendt et al. |
| 2004/0031059 A1 | 2/2004 | Bialk et al. |
| 2004/0059781 A1 | 3/2004 | Yoakum et al. |
| 2004/0064581 A1 | 4/2004 | Shitama et al. |
| 2004/0071164 A1 | 4/2004 | Baum |
| 2004/0139193 A1 | 7/2004 | Refai et al. |
| 2004/0210621 A1 | 10/2004 | Antonellis |
| 2004/0264484 A1 | 12/2004 | Kui et al. |
| 2005/0022189 A1 | 1/2005 | Proulx et al. |
| 2005/0027845 A1 | 2/2005 | Secor et al. |
| 2005/0091482 A1 | 4/2005 | Gray et al. |
| 2005/0094653 A1 | 5/2005 | Milburn et al. |
| 2005/0240835 A1 | 10/2005 | Dragnea et al. |
| 2006/0002401 A1 | 1/2006 | Mukherjee et al. |
| 2006/0146694 A1 | 7/2006 | Hamaguchi et al. |
| 2006/0167703 A1 | 7/2006 | Yakov |
| 2006/0187855 A1 | 8/2006 | Booth, III et al. |
| 2006/0215577 A1 | 9/2006 | Guichard et al. |
| 2006/0268740 A1 | 11/2006 | Rosenberg et al. |
| 2006/0287593 A1* | 12/2006 | Jaggu et al. ................... 600/407 |
| 2007/0041554 A1 | 2/2007 | Newman et al. |
| 2007/0050497 A1 | 3/2007 | Haley et al. |
| 2007/0053368 A1 | 3/2007 | Chang et al. |
| 2007/0250625 A1 | 10/2007 | Titus |
| 2007/0274285 A1 | 11/2007 | Werber et al. |
| 2007/0280241 A1 | 12/2007 | Verma |
| 2008/0002975 A1 | 1/2008 | Vukovic et al. |
| 2008/0052539 A1* | 2/2008 | MacMillan et al. .......... 713/193 |
| 2008/0317039 A1 | 12/2008 | Satterlee et al. |
| 2009/0067324 A1 | 3/2009 | Licardie et al. |
| 2009/0198832 A1 | 8/2009 | Shah et al. |
| 2009/0201911 A1 | 8/2009 | DuPertuis et al. |
| 2009/0222547 A1 | 9/2009 | Boylan et al. |
| 2009/0296588 A1 | 12/2009 | Nishi et al. |
| 2010/0153537 A1 | 6/2010 | Wang et al. |
| 2010/0195489 A1 | 8/2010 | Zhou et al. |
| 2011/0004885 A1* | 1/2011 | Kikuchi et al. ............... 718/104 |
| 2011/0013643 A1* | 1/2011 | Yang et al. .................... 370/423 |

OTHER PUBLICATIONS

Gonzalez, Jose, et al., "Customer Link Diversity Monitoring", U.S. Appl. No. 11/620,140, filed Jan. 5, 2007.

Gonzalez, Jose, et al., "Virtual Link Mapping", U.S. Appl. No. 11/746,273, filed May 9, 2007.

Gonzalez, Jose, et al., "Network Access and Quality of Service Troubleshooting", U.S. Appl. No. 11/838,175, filed Aug. 13, 2007.

Ham, David M., et al., "Flexible Grouping for Port Analysis", U.S. Appl. No. 12/036,289, filed Feb. 24, 2008.

Ham, David M., et al., "Translating Network Data into Customer Availability", U.S. Appl. No. 12/273,537, filed Nov. 18, 2008.

Lobo, Shane A., et al., "Service Grouping for Network Reporting," U.S. Appl. No. 12/480,681, filed Jun. 8, 2009.

Baader II, Michael Joseph, et al., "Associating Problem Tickets Based on Integrated Network and Customer Database," U.S. Appl. No. 12/546,351, filed Aug. 24, 2009.

Lushear, Brian D., "End-to-End Network Monitoring," U.S. Appl. No. 12,639,906, filed Dec. 16, 2009.

Office Action dated Mar. 2, 2009, U.S. Appl. No. 11/551,704, filed Oct. 21, 2006.

Final Office Action dated Aug. 13, 2009, U.S. Appl. No. 11/551,704, filed Oct. 21, 2006.

Office Action (Advisory Action) dated Oct. 16, 2009, U.S. Appl. No. 11/551,704, filed Oct. 21, 2006.

Office Action dated Dec. 31, 2009, U.S. Appl. No. 11/551,704, filed Oct. 21, 2006.

Office Action dated May 20, 2010, U.S. Appl. No. 11/551,704, filed Oct. 21, 2006.

Notice of Allowance dated Oct. 28, 2010, U.S. Appl. No. 11/551,704, filed Oct. 21, 2006.

Supplemental Notice of Allowance dated Dec. 8, 2010, U.S. Appl. No. 11/551,704, filed Oct. 21, 2006.

Office Action dated Jun. 15, 2009, U.S. Appl. No. 11/620,140, filed Jan. 5, 2007.

Final Office Action dated Nov. 27, 2009, U.S. Appl. No. 11/620,140, filed Jan. 5, 2007.

Advisory Action dated Feb. 17, 2010, U.S. Appl. No. 11/620,140, filed Jan. 5, 2007.

Notice of Allowance dated Mar. 22, 2010, U.S. Appl. No. 11/620,140, filed Jan. 5, 2007.

Office Action dated May 25, 2010, U.S. Appl. No. 11/746,273, filed May 9, 2007.

Final Office Action dated Nov. 19, 2010, U.S. Appl. No. 11/746,273, filed May 9, 2007.

Advisory Action dated Feb. 10, 2011, U.S. Appl. No. 11/746,273, filed May 9, 2007.

Office Action dated Mar. 31, 2011, U.S. Appl. No. 11/746,273, filed May 9, 2007.

Office Action dated Nov. 1, 2011, U.S. Appl. No. 11/746,273, filed May 9, 2007.

Notice of Allowance dated Jun. 8, 2012, U.S. Appl. No. 11/746,273, filed May 9, 2007.

Office Action dated Apr. 3, 2009, U.S. Appl. No. 11/838,175, filed Aug. 13, 2007.

Final Office Action dated Nov. 24, 2009, U.S. Appl. No. 11/838,175, filed Aug. 13, 2007.

Advisory Action dated Mar. 24, 2010, U.S. Appl. No. 11/838,175, filed Aug. 13, 2007.

Notice of Allowance dated Aug. 2, 2010, U.S. Appl. No. 11/838,175, filed Aug. 13, 2007.

Office Action—First Action Interview Pilot Program Pre-Interview Communication dated Apr. 2, 2010, U.S. Appl. No. 12/036,289, filed Feb. 24, 2008.

Notice of Allowance dated Jul. 26, 2010, U.S. Appl. No. 12/036,289, filed Feb. 24, 2008.

(56) References Cited

OTHER PUBLICATIONS

Notice of Allowance dated Oct. 15, 2010, U.S. Appl. No. 12/273,537, filed Nov. 18, 2008.
Supplemental Notice of Allowance dated Nov. 12, 2010, U.S. Appl. No. 12/273,537, filed Nov. 18, 2008.
Supplemental Notice of Allowance dated Jan. 10, 2011, U.S. Appl. No. 12/273,537, filed Nov. 18, 2008.
Office Action dated Jun. 9, 2011, U.S. Appl. No. 12/480,681, filed Jun. 8, 2009.
Final Office Action dated Nov. 9, 2011, U.S. Appl. No. 12/480,681, filed Jun. 8, 2009.
Advisory Action dated Jan. 23, 2012, U.S. Appl. No. 12/480,681, filed Jun. 8, 2009.
Notice of Allowance dated Mar. 5, 2012, U.S. Appl. No. 12/480,681, filed Jun. 8, 2009.
Pre-Interview Communication dated Jun. 29, 2012, U.S. Appl. No. 12/546,351, filed Aug. 24, 2009.
FAIPP Office Action dated Aug. 28, 2012, U.S. Appl. No. 12/546,351, filed Aug. 24, 2009.
Notice of Allowance dated Jan. 31, 2013, U.S. Appl. No. 12/546,351, filed Aug. 24, 2009.
Pre-Interview Communication dated Jun. 15, 2012, U.S. Appl. No. 12/639,906, filed Dec. 16, 2009.
Office Action—FAIPP dated Jul. 26, 2012, U.S. Appl. No. 12/639,906, filed Dec. 16, 2009.
Notice of Allowance dated Sep. 13, 2012, U.S. Appl. No. 12/639,906, filed Dec. 16, 2009.
"traceroute", Wikipedia, http://en.wikipedia.org/w/index.php?title=Traceroute&printable=yes, Oct. 19, 2009, pp. 1-4, Wikipedia.org.

* cited by examiner

ENABLING USER DEFINED NETWORK CHANGE LEVERAGING AS-BUILT DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Voice and data networks used by enterprises may feature routers and other devices with ports that receive and pass transmissions to users. Routers contain software and hardware that may be customized to the tasks of routing and forwarding a variety of packet types. Routers have multiple network interfaces, which may be to different physical types of networks and to networks that observe a plurality of different networking standards. Besides making determinations about which interface a packet is forwarded to, a router also manages congestion, when packets arrive at a rate higher than the router can process. Routers may use policies to manage traffic and reduce congestion. Routers may provide connectivity inside enterprises, between enterprises and the Internet, and inside internet service providers. Enterprises that are widely distributed with few or no central locations may subscribe to Wide Area Network (WAN) services hosted by telecommunications service providers. Such providers may offer managed Internet Protocol (IP) solutions that may integrate voice and data infrastructures. The solutions may segment user traffic across the provider's network backbone and isolate individual customer networks completely from each other.

SUMMARY

In an embodiment, a network change management system is provided. The system comprises a processor, a memory, and an application stored in the memory that, when executed by the processor, receives a first message from a first customer device in an enterprise network, the first message containing a first change request to a first network configuration used by the first customer device. The system also identifies components of the first network configuration impacted by the first change request. The system also receives a second message from a second customer device in the enterprise network, the second message containing a second change request to a second network configuration used by the second customer device. The system also identifies components of the second network configuration impacted by the second change request. The system also filters information contained in the second change request about the second customer device and the components impacted by the second change request. The system also analyzes the first change request wherein the first change request impacts at least one component impacted by the second change request and wherein the first change request has not been implemented. The system also sends a third message to the second customer device presenting the current as-built configuration of the second network configuration and further describing the impact to the at least one component of the first change request. The system also approves one of the entirety and a portion of the second change request based on analysis of the results of the at least one applied filtering criterion and based on analysis of a previous commitment associated with the first change request. The system also sends a fourth message to the second customer device, the fourth message presenting at least one available option associated with the second change request, the at least one available option associated with the second change request, the at least one available option based on the one of the approved entirety and the portion of the second change request. The system also receives a fifth message from the second customer device, the fifth message containing the selection by the second customer device of one available option associated with the second change request. The system also processes the second change request based on receiving the fifth message.

In an embodiment, a processor-implemented network change management method is provided. The method comprises a server associated with a telecommunications service provider receiving a message from a first service requester associated with a first customer, the message requesting fulfillment of a change request to a component associated with a network port on a system provided by the telecommunications service provider, the system providing at least one of voice and data services. The method also comprises the server generating, based on the network port specified, information associated with the at least one voice and data service and further generating information about the status of the network port and policies associated with the network port. The method also comprises the server generating information about access rights associated with the first service requester regarding the network port. The method also comprises the server providing, based on the information generated, a change request form to the first service requester, the change request form containing as-built configuration information about the network port and containing populated information fields, and wherein the change request form presents at least one available configuration option based on the change request, the as-built information, the access rights, and the policies. The method also comprises the server receiving the completed change request form from the first service requester, the completed change request form choosing one available configuration option. The method also comprises the server analyzing at least one previously issued commitment associated with at least one previously received change request from at least a second service requester associated with a second customer wherein a conflict is identified between the at least one issued commitment and specifications in the completed change request form received from the first service requester. The method also comprises the server resolving the conflict and notifying the first service requester of an adjustment to the completed change request form, the adjustment arising from the resolution of the conflict. The method also comprises the server receiving acknowledgment of the adjustment and confirmation of the request to proceed with the change request from the first service requester. The method also comprises the server processing the completed change request form, the completed change request form containing the adjustment.

In an embodiment, a processor-implemented network change management method is provided. The method comprises a server associated with a telecommunications service provider providing information about a first as-built configuration for a network port to a first service requester and a second service requester, wherein the first service requester and the second service requester are associated with the same customer entity. The method also comprises the server receiving a first change request from the first service requester and receiving a second change request from the second service requester wherein each of the first change request and the second change request is associated with the network port. The method also comprises the server identifying a higher level of importance for the first change request in relation to the second change request and determining that the first change request is to be executed prior to the second change request. The method also comprises the server determining that implementing the first change request results in the network port having a second as-built configuration and further determining that the second as-built configuration necessitates a first adjustment to the second change request. The method also comprises the server notifying the second service requester of the necessity of the first adjustment to the second change request. The method also comprises the server receiving instruction from the second service requester to proceed with the second change request modified for the first adjustment. The method also comprises the server implementing the first change request, the implementation of the first change request resulting in the network port having the second as-built configuration. The method also comprises the server receiving a third change request from a third service requester wherein the third change request is associated with the network port and is based on the second as-built configuration. The method also comprises the server determining that the third change request takes priority over the second change request. The method also comprises the server determining that implementing the third change request prior to the second change request results in the network port having a third as-built configuration and further determining that the third as-built configuration necessitates a second adjustment to the second change request. The method also comprises the server notifying the second service requester of the necessity of the second adjustment to the second change request and the server receiving a message from the second service requester canceling the second change request. The method also comprises the server implementing the third change request, the implementation of the third change request resulting in the network port having the third as-built configuration. The method also comprises the server receiving a fourth change request form the second service requester. The method also comprises the server implementing the fourth change request, the implementation of the fourth change request resulting in the network port having a fourth as-built configuration. The method also comprises the server sending a message to each of the first service requester, the second service requester, and the third service requester, the message describing the fourth as-built configuration and further describing the chronology of changes made to the network port in fulfilling the first change request, the third change request, and the fourth change request.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
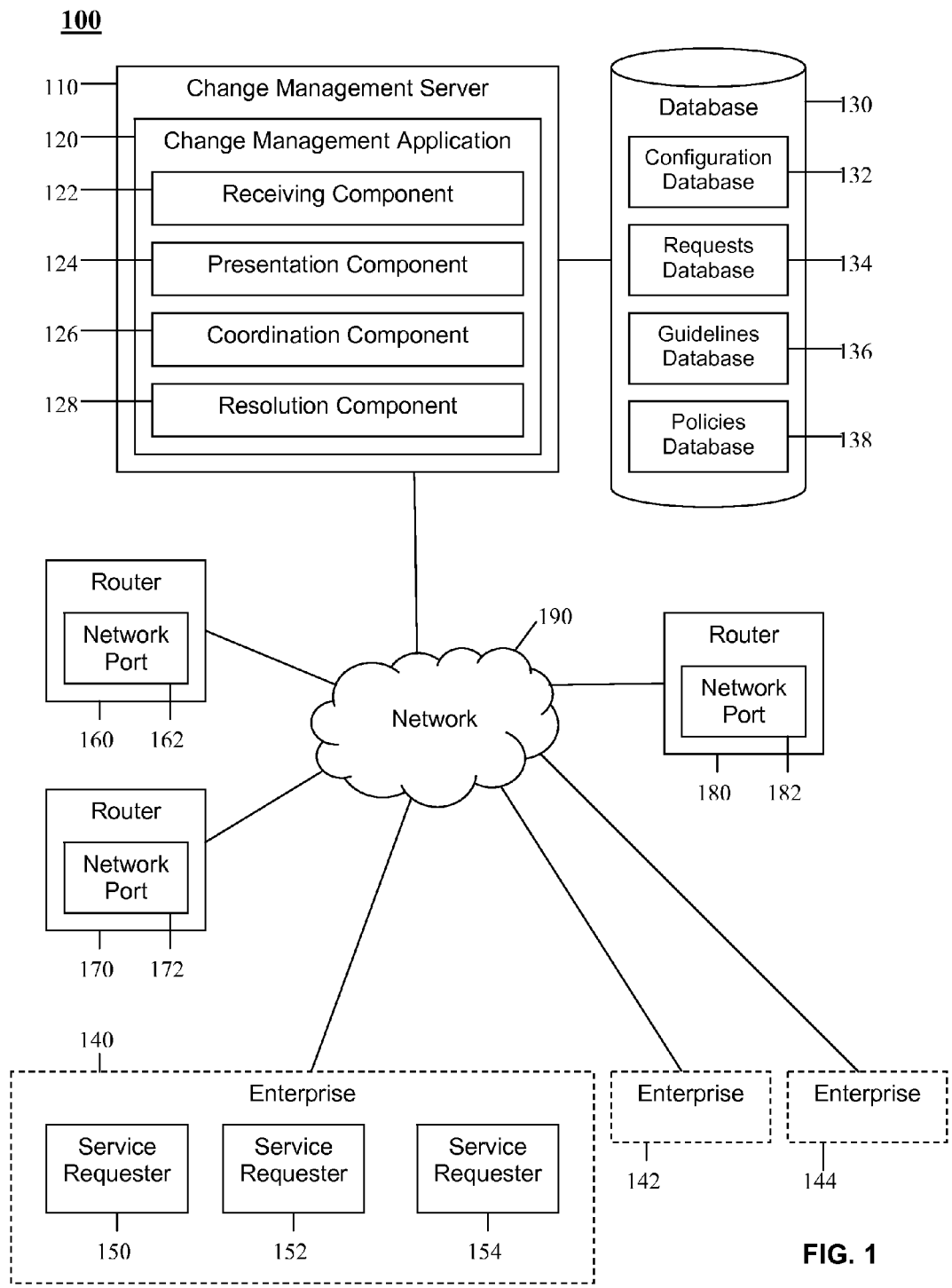
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure describes a system and methods of user defined network change leveraging as-built data that present the current as-built configuration of network components and selected supporting information to service requesters. The system may promote better user understanding of network structure and status and more accurate user submission and more efficient provider processing of change requests. A service requester on an enterprise network may consider a change request to a network port. As used herein, a network port refers to a port on a computer or computer system hosted by a telecommunications service provider, for example a router or other network component, and is meant to be distinguished from a port that may be located on a router or other communication equipment that is located on a customer premises and that may be referred to in some contexts as a customer premises equipment (CPE) port. The service requester is provided selected configuration information about the network port in its current as-built state. The service requester is additionally provided a description of change requests for the network port submitted by other service requesters that are pending implementation. The service requester is also given a history of previous change requests associated with the network port made by the service requester that have been implemented to provide background and further assist in determining whether and how to submit a new change request. By providing the current as-built configuration and limited additional information that the customer needs, the system may empower the customer to make informed and accurate decisions about resource usage associated with the network port and the submission of change requests.

When networks are built, diagrams may be developed and issued to departments within the enterprise. Networks, however, may change often and published documentation distributed to users may not keep up with the changes. Spreadsheets and other documentation are static in nature and may get out of date. Users may receive information about network updates on a piecemeal and intermittent basis. Outdated information in the hands of users and managers can lead to ill-informed decisions about submitting requests for new resources and changes to existing resources. Network performance may suffer when decisions are made based on outdated or stale information. For example, decisions made about network load balancing that are based on old information may exacerbate instead of resolve a network performance problem. In addition, network security may be compromised when permissions and user accounts are based on information that is outdated. Old and inactive user accounts represent opportunities for malicious parties to gain access to an enterprise network, cause damage, and perpetrate fraud.

When a service requester in an enterprise network indicates an intention to submit a change request for a network port, the system applies filtering criteria described in policies associated with the network port. The system may analyze a communication services subscription account associated with the service requester. The current as-built configuration of the network port is also generated. Before providing the as-built configuration to the service requester, the system filters from the as-built configuration information that is either not relevant to the service requester or of a privileged or confidential nature and deemed beyond the service requester's viewing permissions. Additionally, an enterprise may have a number of different service requestors—for example an account department service requestor, a marketing department service requestor, a sales department service requestor, etc.—and each service requestor may have different permissions for viewing information about the network port. The system filters out extraneous information about the as-built configuration of the network port and also filters out confidential information about pending change requests submitted by other service requesters. The system may present only the information that the service requester needs to make an informed decision about a change request. The service requester is provided an electronic form with data fields pre-populated with information specific to the service requester, as-built configuration information, and selected information about pending change requests. The electronic form may also provide information about available change request options to the service requester. The electronic form may limit the service requester to submitting requests for changes that are possible given the current as-built configuration, given currently pending change requests, given the service requester's permission levels and services under contract, and given policies of the telecommunications service provider regarding the network port.

The present disclosure contemplates a dynamic network environment wherein a plurality of service requesters access a network port and may have a variety of different service requirements and access permissions. Some service requirements may be related to network problems, for example service outages or degradations, and may therefore have a higher severity and handling priority than other change requests that may, for example, seek enhancements to service features. Service requesters that are significant sources of revenue to a telecommunications service provider may be given priority in receiving service over less profitable customers. At a given time, the telecommunications service provider may be processing a plurality of change requests affecting a network port wherein the implementation steps of unrelated change requests are interrelated because they impact common hardware and software components of the network port and may have to be executed in a particular order. Change requests in a dynamic network environment may not be handled sequentially on a first in, first out basis, and the steps of different change requests may therefore necessarily be stacked and linked in the system of the telecommunications service provider. Because of the interrelationships of the actions of a plurality of change requests being simultaneously processed and the dynamic nature of the environment, it may serve all service requesters to have regular access to information about the current as-built configuration of the network. The present disclosure describes practical solutions for managing enterprise network requests for port changes including hardware and/or software changes in the context of a network port and/or network router whose as-built-configuration is in flux.

Turning now to FIG. 1, a system 100 of user defined network change leveraging as-built data is provided. The system 100 comprises a change management server 110, a change management application 120, a database 130, enterprises 140, 142, 144, service requesters 150, 152, 154, routers 160, 170, 180, network ports 162, 172, 182, and a network 190.

The change management server 110 is a computer system. Computer systems are described in detail hereinafter. The change management application 120 executes on the change management server 110 and presents the as-built configuration of the network ports 162, 172, 182 to a plurality of service requesters 150, 152, 154 that may submit change requests for software and/or hardware changes to at least one component of the network ports 162, 172, 182. Presenting the current as-built configuration as well as a description of pending changes may promote better understanding by customers of the telecommunications service provider of the current hardware and software status of the network ports 162, 172, 182 and lead to more accurate submission of change requests and higher customer satisfaction. Presenting the as-built configuration may empower service requesters 150, 152, 154 to take more control over and accountability for their services usage, may relieve handling burden from customer support functions of the telecommunications service provider, and may reduce duplicative work where service requesters 150, 152, 154 may not have understood the configuration of the network port 162.

The as-built configuration of network ports 162, 172, 182 refers to the currently built, installed, and running production structures of the network ports 162, 172, 182. The as-built configuration may contrast to the as-designed configuration of the network ports 162, 172, 182. An organization may maintain network documents or records that depict designed structure of its network, including network ports 162, 172, 182. The actual and currently as-built structure may differ from what is depicted in the design documents. Documents depicting design may not be instantaneously updated for hardware changes, software updates, and changes related to break/fix operations. The as-built configuration may contain notations or references to these recent amendments or revisions and may provide links or pointers to documents describing the changes and containing approvals. Network ports 162, 172, 182 that are running but also at various stages of construction or upgrade may change on a daily basis. The design documents and as-built configuration documents may therefore differ from each other in various ways from day to day. An organization may use software tools to generate snapshots or other views of the current as-built configuration of the network ports 162, 172, 182 that its service requesters 150, 152, 154 are using.

Service requesters 150, 152, 154 may correspond to units or department within enterprises that use network ports 162, 172, 182 of routers 160, 170, 180 to access voice and data services offered by a telecommunications service provider. The service requester 150 may be a department, workgroup, or other organizational unit within an enterprise that subscribes for services from the telecommunications service provider. Each service requester 150, 152, 154 within an enterprise may have its own specific voice and data transmission needs and may therefore have a different subscription account with the telecommunications service provider. For example, the service requestor 150 may be associated with an interface accessed by a member of an accounting department to enter a change request; the service requestor 152 may be associated with an interface accessed by a member of a marketing team to enter a change request; the service requestor 154 may be an interface accessed by a member of a sales department to enter a change request. The service requestors 150, 152, 154 may be considered to be similar in some respects to seats provided by a software application.

The routers 160, 170, 180 and their network ports 162, 172, 182 may be owned, controlled, or managed by the telecommunications service provider. The telecommunications service provider may have as customers a plurality of enterprises or other organizations, each of which may comprise a plurality of service requesters 150, 152, 154. A large retailer, for example, may have different organizational units for in-store sales, catalogue sales, and online sales of apparel and other merchandise. Each unit may have different voice and data needs and may, therefore, have different services subscriptions with the telecommunications service provider. Each unit may be a different service requester 150, 152, 154. From the perspective of the telecommunications service provider, each service requester 150, 152, 154 may be viewed as a customer unit, portal access, or interface with transmissions originating from the interface coming from a plurality of different customer devices, perhaps situated at many different locations.

The change management application 120 promotes accurate and complete customer-driven change requests by providing raw, current data about the configuration of the network port 162 to the service requester 150. The change management application 120 integrates the as-built configuration information with data specific to the service requester 150 that is viewing data about the network port 162 and may be submitting a change request. The as-built configuration information may be integrated with the data specific to the service requester 150 to facilitate more informed decisions by the service requester 150 in requesting changes. The information provided to the service requester 150 may exclude data about aspects of the network port 162 that involve other service requesters 152, 154 wherein the data excluded may be confidential as well as deemed not relevant to the decision-making process of the service requester 150 considering the change request. By integrating the as-built configuration information with the service requester 150 data, the service requester 150 may develop a more informed perspective of its own usage of network resources and requirements, particularly as regards a contemplated change request. By limiting the view of the service requester 150 to the as-built configuration and to its own involvement in the configuration and by excluding privileged as well as extraneous information related to other service requesters 152, 154 and their usage, the attention of the viewing service requester 150 may be better directed to the areas wherein more informed and accurate changes may be made. Allowing the service requester 150 to see the configuration of the network port 162 as it is currently built may provide the service requester 150 a better perspective on previous changes the service requester 150 and others have made and how those changes impact performance presently experienced by the service requester 150.

The change management application 120 maintains a historical record of change requests received and placed into production for the network port 162 and may make the history available on a selective basis to service requesters 150, 152, 154 analyzing the network port 162 and considering submission of a change request to some aspect of the network port 162. The change management application 120 may also make visible to a service requester 150 a description of pending change requests from other service requesters 152, 154 that may be approved or pending approval but have yet to be implemented on the network port 162. The information about pending changes made visible to the service requester 150 may depend on the level of permissions of the service requester 150 and the relevance of the information to the particular situation of the service requester 150.

In an embodiment, a plurality of change requests may be submitted by various service requesters 150, 152, 154 during a time period. At a given time, one or more change requests may be approved and pending implementation, awaiting approval, or have some other status. Some change requests may be approved as submitted. Other change requests may require modifications before they may be approved or may be tabled pending the securing of further information, for example. Still other change requests may be declined. Service requesters 150, 152, 154 may submit change requests for a plurality of reasons. They may have a need for increased or decreased traffic handling capacity or may have a need for a different type of service. They may request a change in performance of some component of their voice and/or data service, for example an improvement in performance when users may complain about slow network performance, or a reduction in performance when the service requester 150 may not require the level of performance received and may wish to reduce costs.

The telecommunications service provider that provides the network ports 162, 172, 182 for access to voice and data services may apply a plurality of criteria and/or rules to change requests to determine what portion, if any, of the change requests to allow and how to prioritize change requests for scheduling and implementation. The telecommunications service provider may apply technical criteria to change requests to determine the technical complexity and cost of the change requests, the costs measured in terms of direct incurred costs as well as potential opportunity costs of lost revenue associated with downtime. Direct costs may involve the acquisition of new hardware, the retirement of legacy hardware, design, personnel costs, software development, rollout, and testing of changes. In an embodiment, the telecommunications service provider may bear all of the costs of a change request, the service requester 150 may bear the costs, or the burden may be shared.

In addition to cost, the telecommunications service provider may also prioritize received change requests by a degree of service requester privilege or need for service improvement. Some change requests may be submitted because a service requester 150 is suffering from degradation of service or even defective service. Other change requests may be submitted because the service requester 150 may be experiencing satisfactory service but may desire an enhancement of service in terms of boosted performance or added functionality. The telecommunications service provider may institute policies to determine level of criticality of need and may consider change requests based on service loss and degradation before service enhancement requests. In addition to cost and need, the telecommunications service provider may also consider the economic status of the service requester 150 when determining if and when to approve and execute a change request. Some customers may be small and marginally profitable for the telecommunications service provider and may not be eligible to submit change requests under any circumstances. Other customers may be large and highly profitable and may submit a plurality of change requests to the telecommunications service provider, with most or all of the change requests being honored.

At a given time, the telecommunications service provider may have a plurality of pending change requests for the network port 162 that are waiting to be placed into production. The telecommunications service provider may use various combinations of criteria in determining when to execute change requests into production. Each time a change request is executed, the as-built configuration of the network port 162 may change, if only in a limited manner. The telecommunications service provider maintains a record of the current as-built configuration and previous as-built configurations. When a service requester 150 submits a change request, the change management application 120 sends the current as-built configuration of the network port 162 to the service requester 150 and provides information about pending change requests that impact the network port 162. The change management application 120 may not present all of the information about the as-built configuration of the network port 162. The change management application 120 may provide only the information that the service requester 150 has a right to know under its contractual arrangement or needs to know in order to make an informed decision about a contemplated change request. The change management application 120 filters out of the material provided to the service requester 150 information about the network port 162 deemed not relevant to the service requester 150 and information about other service requesters 152, 154 that the service requester 150 should not be privy to.

The change management application 120 identifies the information about the current as-built configuration and the information about pending change requests that the service requester 150 needs to know to make an informed decision about a change request. The intention of the telecommunications service provider in limiting information provided to the service requester 150 may not be to enforce secrecy or control over its customers. Rather, the telecommunications service provider may wish that its customers, the service requesters 150, 152, 154, make the most empowered, informed, and accurate and profitable decisions about change requests. Providing the information that is determined to be relevant to the decision process of the service requester 150 and filtering out information that is confidential, extraneous, and otherwise unrelated to the service requester 150 may provide a valuable service to the service requester 150 and make the task of the service requester 150 easier in choosing whether and how to submit its change request.

The present disclosure teaches a system and methods based on a plurality of service requesters 150, 152, 154 requesting changes to their configurations and services during a given time period, each service requester 150 in an embodiment having its own voice and/or data services arrangement. Service requesters 150, 152, 154 may vary significantly in their functional roles and their service needs may differ greatly as may their service plans with the telecommunications service provider. The criticality of change requests may also vary and the criticality may affect the prioritization of change requests, including scheduling. The needs of service requester 150, 152, 154 may change unexpectedly and the needs of the telecommunications service provider may also change. It may become necessary for the telecommunications service provider to alter the order of scheduling of change requests, sometimes with little notice to the service requesters 150, 152, 154 involved. The flexibility exhibited by the components of the system 100 and associated methods allow for the need of the telecommunications service provider to make changes based on its own requirements and those of its customers, the service requesters 150, 152, 154. In contrast to previous technologies that may have served simpler customer needs wherein a stream of incoming change requests might be handled on a transactional, linear, and first in, first out (FIFO) basis, the present disclosure provides a dynamic system where multiple users with different skill sets may have different access options to the functionality of the change management application 120. Activities associated with each approved change request may be undertaken and executed concurrently. Activities may be effectively stacked and linked such that a plurality of service requesters 150, 152, 154 may need to be regularly kept informed about changes in the as-built configuration of the network port 162 from time to time. The service requester 150 may need to be alerted to some or all changes to the as-built configuration of the network port 162 and may, at times, be contacted about adjustments required to its own pending change requests. Such adjustments may be caused by change requests subsequently submitted by other service requesters 152, 154 wherein the change requests address software or hardware defects discovered at the network port 162 or where the other service requesters 152, 154 involved in the subsequently received change requests have a higher priority on the network.

The present disclosure contemplates dynamism of service requester requirements and preferences in their use of the voice and data network administered by the telecommunications service provider. The change management application 120 may provide service requesters 150, 152, 154 with information about changes to the as-built configuration of the network port 162, whether the service requesters 150, 152, 154 currently are considering change requests or not or presently have change requests pending in one or more stages of approval or implementation. The service requester 150 may make more informed decisions about its use of its available services associated with the network port 162 when it has current information about the as-built configuration and up to date information about pending changes to the configuration of the network port 162 available to it. The present disclosure teaches a system where the service requesters 150, 152, 154 may comprise different user groups or functions with different rights and privileges on a network processing different types of events, with many of these events closely interrelated in terms of their technical steps and production consequences.

The change management application 120 may perform filtering to limit the ability of the service requester 150 to make changes based on the policies of the telecommunications service provider, the as-built configuration of the portion of the network port 162 accessed by the service requester 150, and the services that the service requester 150 has provisioned on the network port 162. The change management application 120 may not present options to the service requester 150 that are not available or possible given the current as-built configuration of the network port 162. The change management application 120 may extend for viewing the history of many or all of the changes made by the service requester 150 and some other service requesters 152, 154 so the service requester 150 may view the revisions they have made. The service requester 150 may view the historical display of its revisions against performance data it may have saved or requested from the telecommunications service provider.

While the present disclosure teaches the empowerment of the service requester 150 to make decisions based on the limited but selected information provided by the change management application 120, the service requester 150 is also provided a secure channel to the customer service function of the telecommunications service provider. The service requester 150 may view and add text comments to or submit questions through the change request form after the change request form has been submitted. Service personnel of the telecommunications service provider perform the work required to fulfill the change request and may continually update databases containing as-built configuration for the service requester 150 to view while the change request is being fulfilled. The same as-built configuration information is viewable for other service requesters 152, 154 as the change management application 120 continually updates the as-built configuration with the most current information. The telecommunications service provider may perform work in a test or simulation environment and, when satisfied that a change is correct, may roll the change into the production environment and generate a new version of the as-built configuration that may then be made entirely or partially available to the service requesters 150, 152, 154.

The database 130 is associated with the change management server 110 and stores a plurality of types of information used by the change management application 120, the service requesters 150, 152, 154, and other components of the system 100. While depicted in FIG. 1 as a single database, the database 130 may contain a plurality of component databases. The database 130 comprises the configuration database 132 that contains the current master as-built configuration for the network ports 162, 172, 182 as well as for the individual as-built configurations for each service requester 150, 152, 154. The as-built configurations may be dynamically updated whenever changes occur. Along with the current as-built configuration records, previously recorded as-built configurations may be stored in the database 130 for a predetermined time period. The individual as-built configurations are subsets or partial views of the master as-built configuration containing the portion of the master as-built configuration that the particular service requester 150, 152, 154 may be permitted to view. As previously described, each service requester 150 may be permitted to view the portion of the as-built configuration relevant to that service requester 150 and may be unable to view portions of the as-built configuration associated with other service requesters 152, 154.

The database 130 also comprises the requests database 134 that is a repository for change requests submitted to the change management application 120. The requests database 134 comprises change requests that have been already completed, change requests that have been received, approved, and have either received some work or are awaiting the beginning of work, and change requests that have been received and are still pending decision on whether and how they will be approved and fulfilled.

The database 130 also comprises the guidelines database 136 that enumerates rules and guidelines for allowing change requests to service requesters 150, 152, 154 under their service agreements with the telecommunications service provider. The guidelines database 136 may contain information about the preferences of service requesters 150, 152, 154 and information about how to deal with change request situations presented by service requesters 150, 152, 154. The guidelines database 136 may contain information associated with a plurality of other service requesters (not shown) that are part of other enterprises 142, 144 separate and distinct from the enterprise 140.

The database 130 also comprises the policies database 138 that is the repository for the telecommunications service provider of its policies to apply to different classes of service requesters 150, 152, 154 based on their usage patterns and contractual arrangements. The policies database 138 is also a general technical database describing the types of technical changes that may be made to different network ports 162, 172, 182. The policies database 138 may be drawn upon by management of the telecommunications service provider to help drive systemwide decisions.

The enterprises 140, 142, 144 may be commercial, governmental, or other entities with which the service requesters 150, 152, 154 are associated. The service requesters 150, 152, 154 are depicted in FIG. 1 as components of the enterprise 140. In an embodiment, the service requesters 150, 152, 154 may be departments or groups within a business organization that is the enterprise 140. In an example, the service requester 150 and the service requester 152 may be separate business units within the enterprise 140 that use the network port 162 of the router 160 provided by the telecommunications service provider for some voice and data services. The service requester 150 and the service requester 152 may have different needs and may submit separate change requests. In an embodiment, the change management application 120 may present different views of the as-built configuration of the network port 162 to the service requester 150 and the service requester 152 because they may use different hardware and software components of the network port 162, may use different voice and data services, and may have confidentiality arrangements with the telecommunications service provider.

While FIG. 1 does not depict components inside of the enterprise 142 and the enterprise 144 and only depicts the service requesters 150, 152, 154 as components of the enterprise 140, this depiction is provided for discussion and simplicity purposes. In reality, a plurality of components may function within the enterprise 142 and the enterprise 144 and access voice and data services through the network ports 162, 172, 182 in manners similar to the service requesters 150, 152, 154.

The routers 160, 170, 180 are computers that comprise the network ports 162, 172, 182, respectively, and provide access to voice and data services of the telecommunications service provider. In an embodiment, the change management server 110 and the routers 160, 170, 180 are hosted and may be operated by the telecommunications service provider although in FIG. 1 the routers 160, 170, 180 are depicted as separate components from the change management server 110.

The network 190 promotes communication between the components of the system 100. The network 190 may be any communication network including a public data network (PDN), a public switched telephone network (PSTN), a private network, and/or a combination. The routers 160, 170, 180 may be conceptualized as components of the network 190 but are shown separately to assist understanding of the disclosure.

The change management application 120 comprises the receiving component 122 that takes delivery of the initial change request inquiry from the service requester 150. The service requester 150 may access the change management application 120 through a web portal application and the receiving component 122 may monitor the web portal for change request messages from service requesters 150, 152, 154. The receiving component 122 accesses the configuration database 132 and applies configuration filters to generate the as-built configuration of the network port 162 specific to the service requester 150. The receiving component 122 examines the guidelines database 136 to determine the subscriptions and other contractual relationships that the telecommunications service provider has with the enterprise 140 and the service requester 150 in terms of voice and data services provided through the network port 162. The guidelines database 136 also provides to the receiving component 122 information about the permissions the service requester 150 has to view information about the network port 162 and submit change requests for the network port 162. The receiving component 122 examines the requests database 134 to review any existing change requests that other service requesters 152, 154 may have pending, either in process or awaiting processing, that affect hardware and software components of the network port 162 that the service requester 150 may use. The receiving component 122 examines the requests database 134 to also review the history of change requests submitted previously by the service requester 150 regarding the network port 162, including change requests that have been fully implemented, partially implemented, approved and awaiting start of work, and previously submitted but awaiting approval or other disposition. The receiving component 122 also examines the policies database 138 to review general technical information about the network port 162 and determine the type of changes that may be permitted to the network port 162.

The change management application 120 also comprises the presentation component 124 that provides an electronic form to the service requester 150 based on analysis and filtering of information drawn from the components of the database 130 and other analysis. Once the receiving component 122 generates the as-built configuration of the network port 162, examines the permissions of the service requester 150, reviews previous and pending change requests impacting the network port 162, reviews general policies regarding the network port 162, and performs the filtering as described to streamline the information to be presented, the presentation component 124 arranges the filtered information for delivery to the service requester 150. The presentation component 124 responds to the initial request of the service requester 150 with an electronic form containing data fields populated with information specific to the service requester 150. The electronic form also contains the as-built configuration with extraneous and privileged information filtered out. The information contained in the electronic form also has been subject to guideline and policy review such that the electronic form may contain only information that is current, useful, and relevant to the service requester 150 in submitting a change request. The presentation component 124 may provide the electronic form with available options for the service requester 150 to choose from in developing a change request. The electronic form may not contain change request options that are not available to the service requester 150 based on the information generated and filtered earlier by the receiving component 122.

The electronic form provided to the service requester 150 by the presentation component 124 contains a description of pending change requests regarding the network port 162, including change requests submitted by the service requester 150 and those submitted by other service requesters 152, 154. The electronic form also contains functionality permitting the service requester 150 to communicate with the service personnel of the telecommunications service provider who may process the change request. The electronic form contains the information needed by the service requester 150 to make an informed choice about how to submit a change request and excludes extraneous and other information that may not be relevant to the decision process of the service requester 150. The electronic form may also contain functionality to promote the service requester 150 to simulate and test change requests under consideration. Once the service requester 150 develops its change request, documents the change request, and submits the change request, the service requester 150 receives a tracking number. The tracking number may be received through the web portal and may also be received in an electronic mail message.

The change management application 120 also comprises the coordination component 126 that approves and schedules the processing of incoming change requests. At a given time, a plurality of change requests may be in process for hardware and software components of the network port 162. Processing each change request may involve a series of steps that are executed in a specific sequence. When a plurality of change requests are being simultaneously processed, the coordination component 126 manages the execution of the individual steps of each change request. In some cases, the coordination component 126 may link actions that involve two or more change requests to assure proper completion of objectives while maintaining integrity of the network port 162. The coordination component 126 manages the implementation and sequencing of these steps to avoid conflicts between change requests as well as expedite the handling of each change request with a minimum of disruption of service on the network port 162. The coordination component 126 manages the cascading effect that some changes may have on some, many, or all service requesters 150, 152, 154 that use a network port 162. An action taken to resolve one problem addressed by a change request may require adjustments in each pending change request associated with the network port 162. In some cases, notifications may have to be sent to service requesters 150, 152, 154 advising them of changes in scheduling or other adjustments to their change requests.

The change management application 120 also comprises the resolution component 128 that resolves conflicts between change requests. In some instances, two or more change requests may call for actions on the network port 162 that conflict with each other for technical, scheduling, business, or other reasons. The resolution component 128 examines the circumstances of each conflict and determines a resolution of the conflict that balances the interests of the service requesters 150, 152, 154 involved and the telecommunications service provider. The resolution component 128 may examine the relative severities of the problems addressed by conflicting change requests and may examine the overall business relationships that the involved service requesters 150, 152, 154 have with the telecommunications service provider in determining resolution. In some cases, conflicts may be resolved by changing the scheduling of some change requests. In other cases, one or more change requests may be required to make adjustments in the changes they have requested, such as in improved performance or access to features. When conflicts are resolved and changes are made, the cascading effect described previously where many service requesters 152, 154 are affected may be observed. The resolution component 128 may work with the coordination component 126 to assure that any other service requesters 152, 154 that are affected by an adjustment to the change request of the subject service requester 150 receive notification. If adjustments to the change requests of the other service requesters 152, 154 are required to accommodate the subject service requester 150, the resolution component 128 and the coordination component 126 assure that the other service requesters 152, 154 receive notification and are provided flexibility to make adjustments.

Figure 2A:
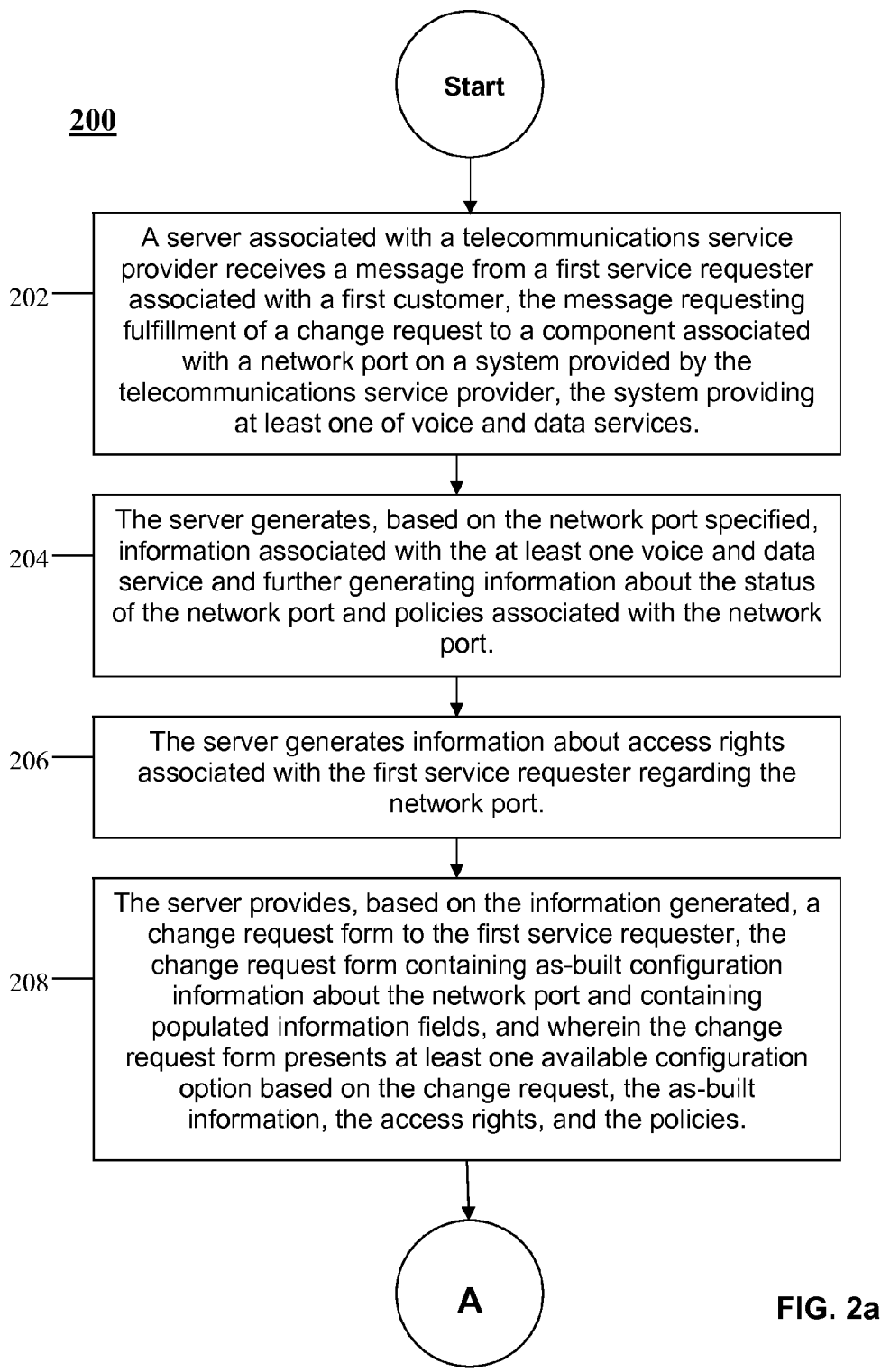
FIG. 2a is a flow chart illustrating a method according to an embodiment of the disclosure.
Figure 2B:
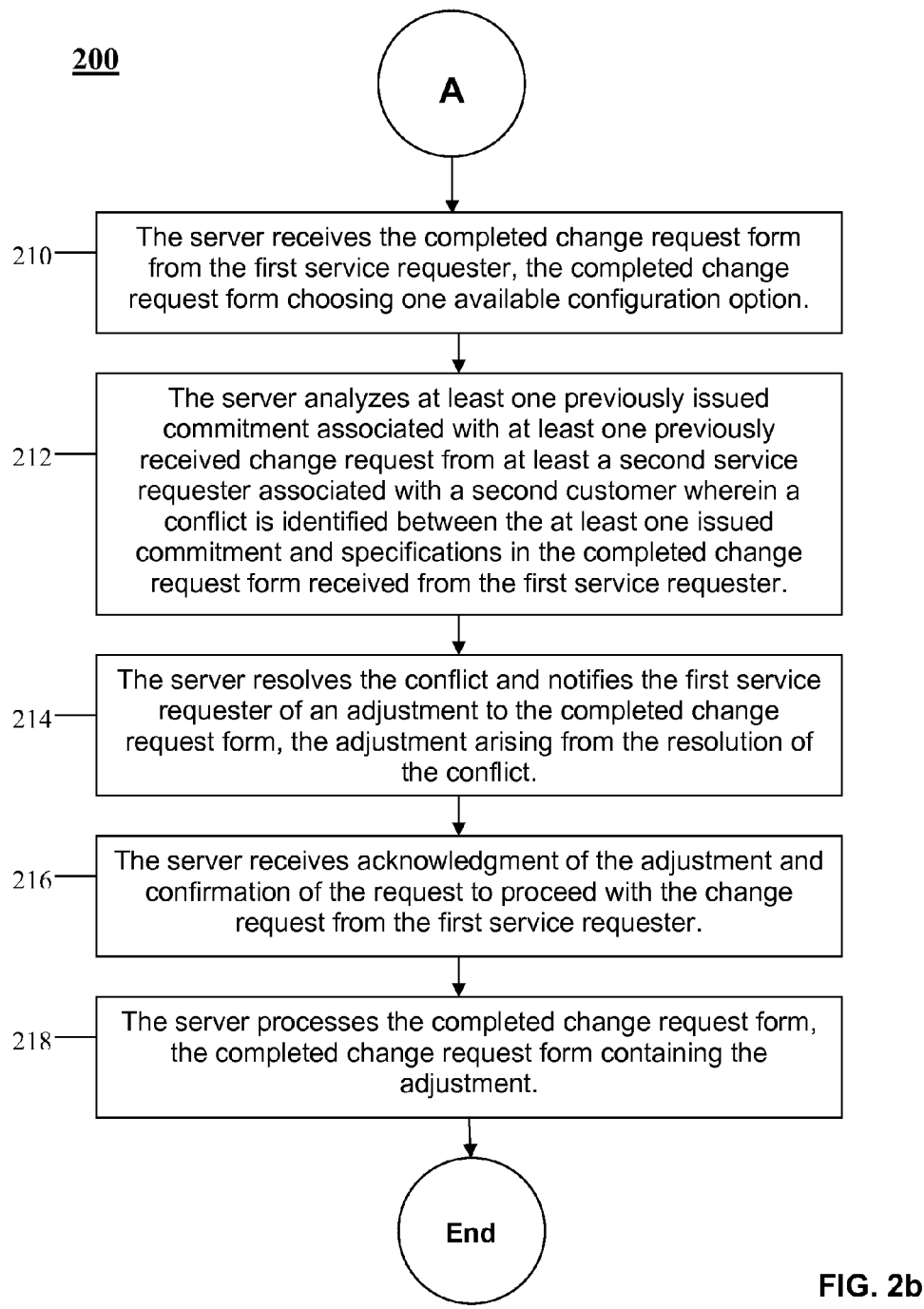
FIG. 2b is a flow chart illustrating a method according to an embodiment of the disclosure.

Turning now to FIG. 2a and FIG. 2b, a processor-implemented network change management method 200 is provided. Beginning at block 202, a server, that may be the change management server 110 and may be associated with a telecommunications service provider, receives a message from a first service requester associated with a first customer, the message requesting fulfillment of a change request to a component associated with a network port on a system provided by the telecommunications service provider, the system providing at least one of voice and data services.

At block 204, the server generates, based on the network port specified, information associated with the at least one voice and data service and further generating information about the status of the network port and policies associated with the network port. At block 206, the server generates information about access rights associated with the first service requester regarding the network port.

At block 208, the server provides, based on the information generated, a change request form to the first service requester, the change request form containing as-built configuration information about the network port and containing populated information fields, and wherein the change request form presents at least one available configuration option based on the change request, the as-built information, the access rights, and the policies. At block 210, the server receives the completed change request form from the first service requester, the completed change request form choosing one available configuration option.

At block 212, the server analyzes at least one previously issued commitment associated with at least one previously received change request from at least a second service requester associated with a second customer wherein a conflict is identified between the at least one issued commitment and specifications in the completed change request form received from the first service requester. At block 214, the server resolves the conflict and notifies the first service requester of an adjustment to the completed change request form, the adjustment arising from the resolution of the conflict.

At block 216, the server receives acknowledgment of the adjustment and confirmation of the request to proceed with the change request from the first service requester. At block 218, the server processes the completed change request form, the completed change request form containing the adjustment.

Figure 3A:
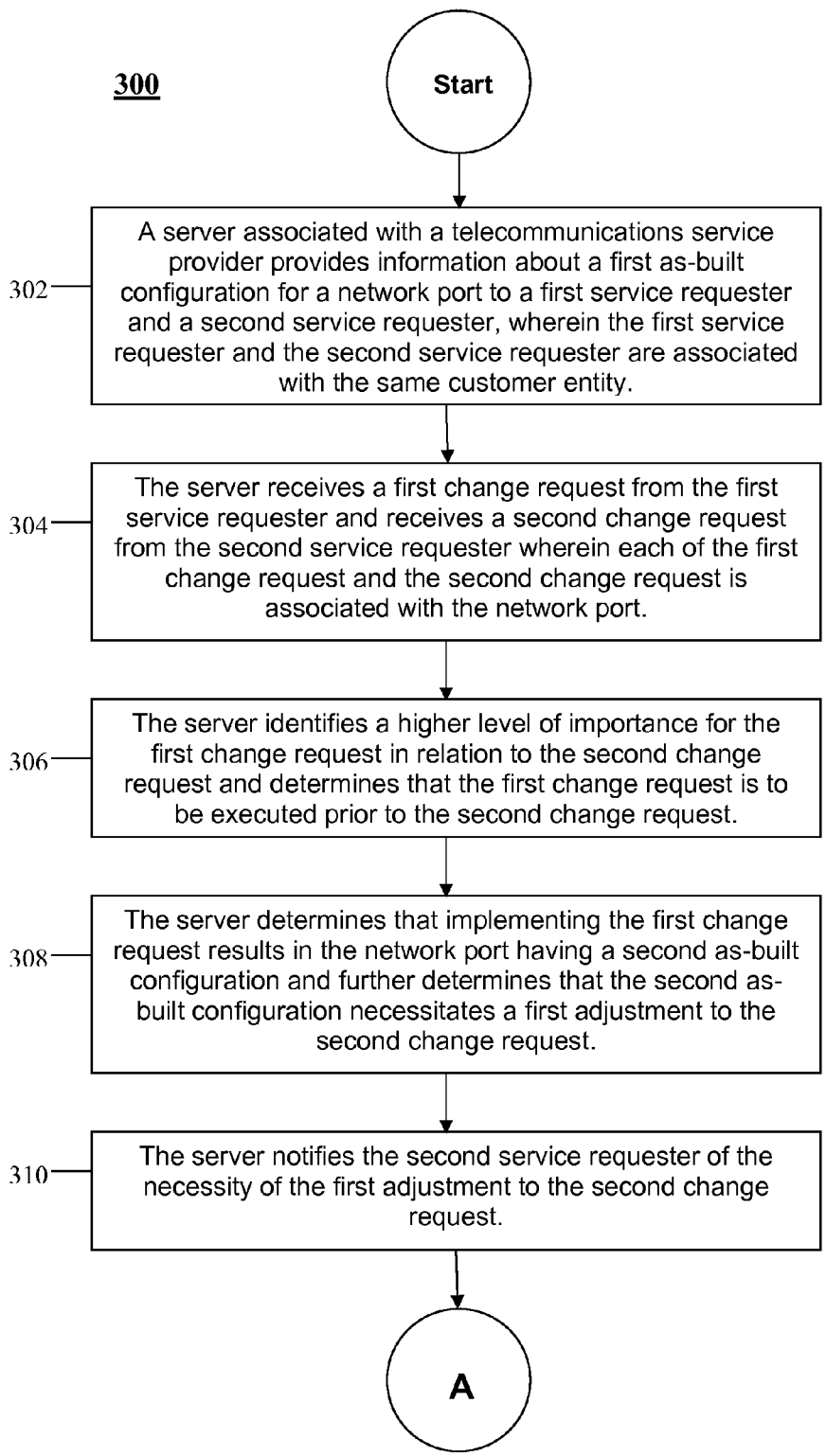
FIG. 3a is a flow chart illustrating a method according to an embodiment of the disclosure.
Figure 3B:
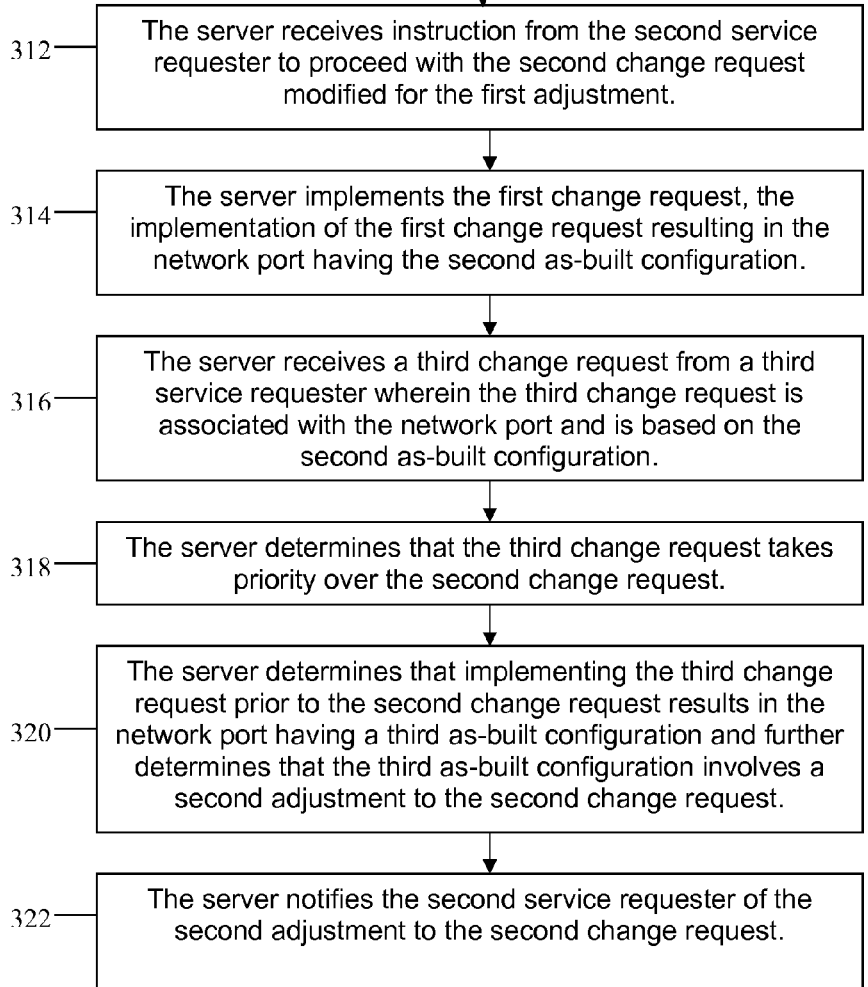
FIG. 3b is a flow chart illustrating a method according to an embodiment of the disclosure.
Figure 3C:
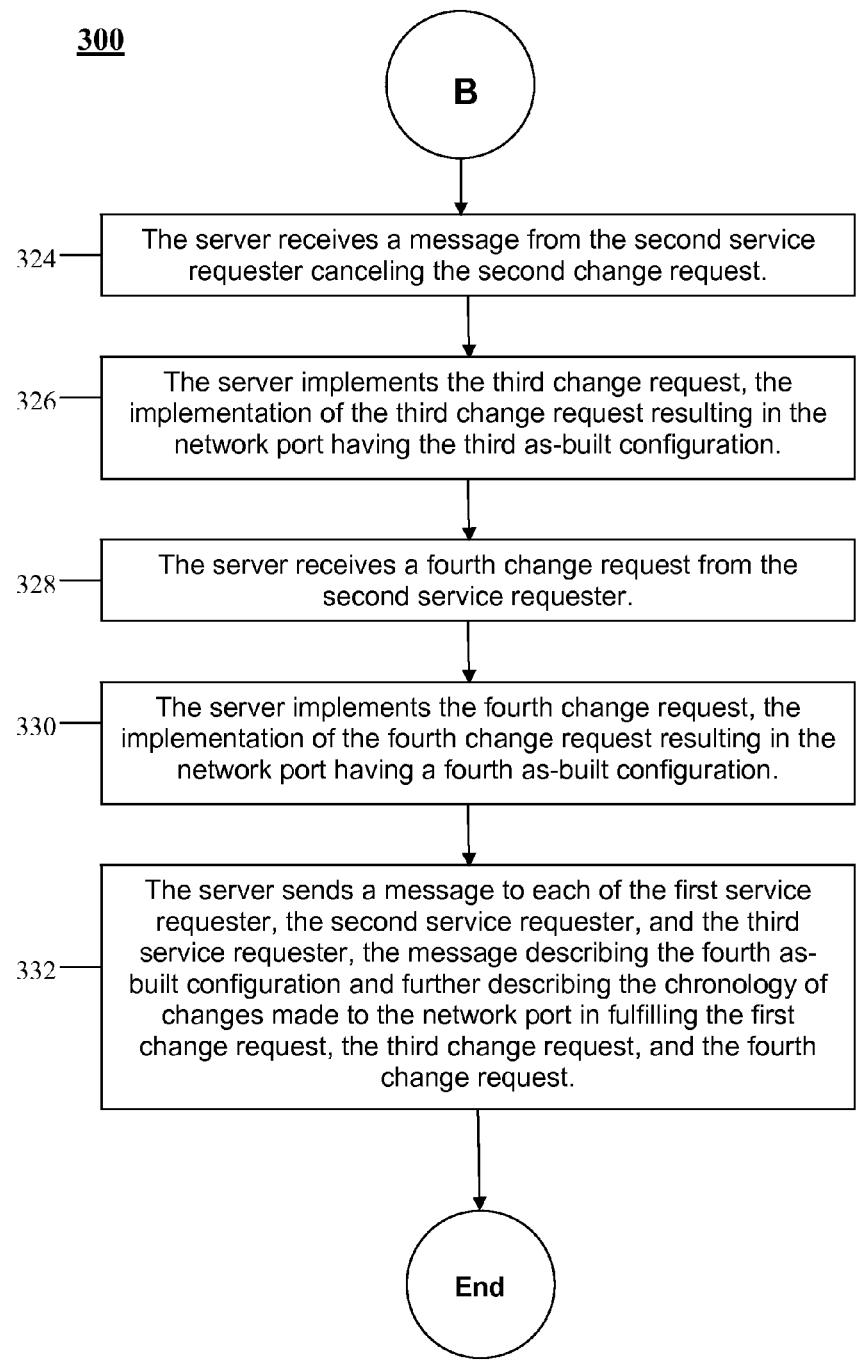
FIG. 3c is a flow chart illustrating a method according to an embodiment of the disclosure.

Turning now to FIG. 3*a*, FIG. 3*b*, and FIG. 3*c*, a processor-implemented network change management method 300 is provided. Beginning at block 302, a server, that may be the change management server 110 and may be associated with a telecommunications service provider, provides information about a first as-built configuration for a network port to a first service requester and a second service requester, wherein the first service requester and the second service requester are associated with the same customer entity.

At block 304, the server receives a first change request from the first service requester and receives a second change request from the second service requester wherein each of the first change request and the second change request is associated with the network port. At block 306, the server identifies a higher level of importance for the first change request in relation to the second change request and determines that the first change request is to be executed prior to the second change request.

At block 308, the server determines that implementing the first change request results in the network port having a second as-built configuration and further determines that the second as-built configuration necessitates a first adjustment to the second change request. At block 310, the server notifies the second service requester of the necessity of the first adjustment to the second change request.

At block 312, the server receives instruction from the second service requester to proceed with the second change request modified for the first adjustment. At block 314, the server implements the first change request, the implementation of the first change request resulting in the network port having the second as-built configuration.

At block 316, the server receives a third change request from a third service requester wherein the third change request is associated with the network port and is based on the second as-built configuration. At block 318, the server determines that the third change request takes priority over the second change request.

At block 320, the server determines that implementing the third change request prior to the second change request results in the network port having a third as-built configuration and further determines that the third as-built configuration involves a second adjustment to the second change request. At block 322, the server notifies the second service requester of the second adjustment to the second change request.

At block 324, the server receives a message from the second service requester canceling the second change request. At block 326, the server implements the third change request, the implementation of the third change request resulting in the network port having the third as-built configuration. At block 328, the server receives a fourth change request from the second service requester.

At block 330, the server implements the fourth change request, the implementation of the fourth change request resulting in the network port having a fourth as-built configuration. At block 332, the server sends a message to each of the first service requester, the second service requester, and the third service requester, the message describing the fourth as-built configuration and further describing the chronology of changes made to the network port in fulfilling the first change request, the third change request, and the fourth change request.

Figure 4:
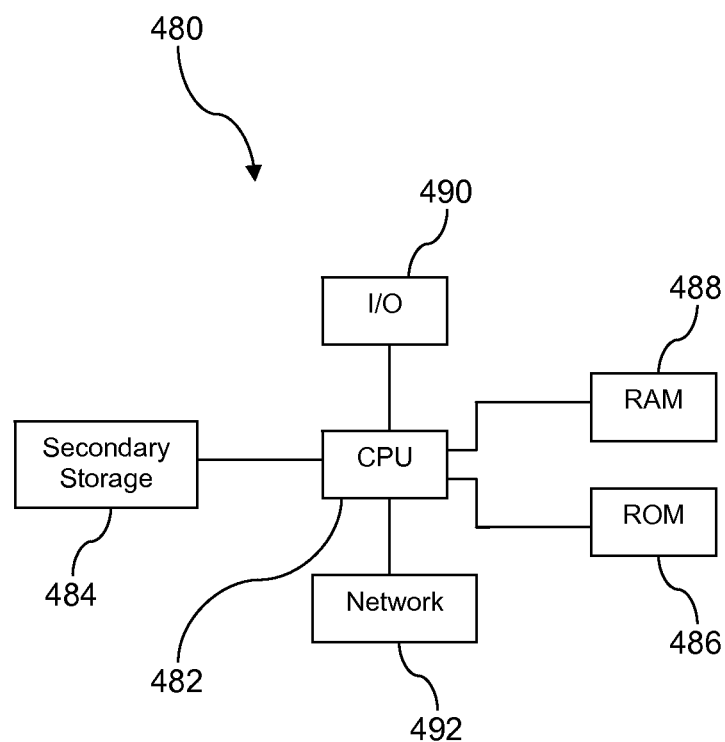
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network change management system, comprising:
   a processor;
   a memory; and
   an application stored in the memory that, when executed by the processor,
      receives a first change request message from a first customer device in an enterprise network, the first change request message containing a first change request to make a first change to a configuration of a network port;
      identifies components of the configuration impacted by the first change request;
      receives a second change request message from a second customer device in the enterprise network, the second change request message containing a second change request to make a second change to the configuration of the network port, wherein the network port is configured to be used by the first customer device and by the second customer device;
      identifies components of the configuration impacted by the second change request;
      filters information contained in the second change request about the second customer device and the components impacted by the second change request by applying at least one filtering criterion;
      analyzes the first change request, wherein the first change request impacts at least one component impacted by the second change request, and wherein the first change request has not been implemented;
      sends a notification message to the second customer device presenting the current as-built configuration of the network port and further describing the impact to the at least one component of the first change request;
      approves one of the entirety or a portion of the second change request based on analysis of the results of the at least one applied filtering criterion and based on analysis of a previous commitment associated with the first change request;
      sends an option message to the second customer device, the option message presenting at least one available option associated with the second change request, the at least one available option is based on the approved one of the entirety or the portion of the second change request;
      receives a submission message from the second customer device, the submission message containing a selection by the second customer device of one of the at least one available option; and
      processes the second change request based on receiving the submission message.

2. The system of claim 1, wherein the network port is on a telecommunications service provider network providing at least one of voice or data services.

3. The system of claim 1, wherein at least one filtering criterion is applied to rights or permissions associated with the first customer device to at least one of view, access, or make changes to the components of the network port configuration impacted by the first change request and the second change request.

4. The system of claim 1, wherein the components of the configuration impacted by the first change request and the second change request are at least one of software components or hardware components.

5. The system of claim 1, wherein the as-built configuration information presented to the second customer device comprises information relevant to the first change request and excludes information determined at least one of not relevant to the second change request or confidential.

6. The system of claim 1, wherein, upon receiving the notification message, the first customer device analyzes the impact to the at least one component of the second change request.

7. The system of claim 6, wherein, upon analyzing the impact to the at least one component of the second change request, the first customer device determines that the impact is acceptable.

8. The system of claim 6, wherein, upon analyzing the impact to the at least one component of the second change request, the first customer device determines that the impact is not acceptable and one of amends the first change request or cancels the first change request.

9. A processor-implemented network change management method, comprising:
   receiving, by a server associated with a telecommunications service provider, a message from a first service requester associated with a first customer, the message requesting fulfillment of a change request to a component associated with a network port on a system provided by the telecommunications service provider, the system providing at least one of voice or data services;
   based on the message, generating, by the server, information associated with the at least one of the voice or data services and further generating information about the status of the network port and policies associated with the network port;
   generating, by the server, information about access rights associated with the first service requester regarding the network port;
   providing, by the server, a change request form to the first service requester based on the information generated, the change request form containing as-built configuration information about the network port and containing populated information fields, wherein the change request form presents at least one available configuration option based on at least one of the change request, the as-built information, the access rights, or the policies;

receiving, by the server, the completed change request form from the first service requester, the completed change request form including a selection of one of the at least one available configuration option;

analyzing, by the server, at least one previously issued commitment associated with at least one previously received change request from at least a second service requester associated with a second customer;

identifying, by the server, based on the analyzing, a conflict between the at least one previously issued commitment and specifications in the completed change request form received from the first service requester;

resolving, by the server, the conflict and notifying the first service requester of an adjustment to the completed change request form, the adjustment arising from the resolution of the conflict;

receiving, by the server, acknowledgment of the adjustment and confirmation of the request to proceed with the change request from the first service requester; and processing, by the server, the completed change request form, the completed change request form containing the adjustment.

10. The method of claim 9, wherein the conflict is related to at least one of a software component of the network port or a hardware component of the network port.

11. The method of claim 9, wherein the conflict is related to the availability of technical resources to implement the change request submitted by the first service requester and the at least one previously received change request.

12. The method of claim 9, wherein the conflict is resolved by amending at least one specification in at least one of the change request or the at least one previously received change request regarding at least one of a hardware change, a software change, a work schedule, or an allocation of resources to address at least one of the change request or the at least one previously received change request.

13. The method of claim 9, wherein the policies describe at least one of the permitted changes to the component associated with the network port.

14. The method of claim 9, wherein in determining the at least one available option and presenting information in the change request form to the first service requester, the server filters out information about the network port that is unrelated to the at least one of the voice or data services and configuration associated with the first service requester.

15. A processor-implemented network change management method, comprising:

a server associated with a telecommunications service provider providing information about a first as-built configuration for a network port to a first service requester and a second service requester, wherein the first service requester and the second service requester are associated with the same customer entity;

the server receiving a first change request from the first service requester and receiving a second change request from the second service requester wherein each of the first change request and the second change request is associated with the network port;

the server identifying a higher level of importance for the first change request in relation to the second change request and determining that the first change request is to be executed prior to the second change request;

the server determining that implementing the first change request results in the network port having a second as-built configuration and further determining that the second as-built configuration necessitates a first adjustment to the second change request;

the server notifying the second service requester of the necessity of the first adjustment to the second change request;

the server receiving instruction from the second service requester to proceed with the second change request modified for the first adjustment;

the server implementing the first change request, the implementation of the first change request resulting in the network port having the second as-built configuration;

the server receiving a third change request from a third service requester wherein the third change request is associated with the network port and is based on the second as-built configuration;

the server determining that the third change request takes priority over the second change request;

the server determining that implementing the third change request prior to the second change request results in the network port having a third as-built configuration and further determining that the third as-built configuration necessitates a second adjustment to the second change request;

the server notifying the second service requester of the necessity of the second adjustment to the second change request;

the server receiving a message from the second service requester canceling the second change request;

the server implementing the third change request, the implementation of the third change request resulting in the network port having the third as-built configuration;

the server receiving a fourth change request from the second service requester;

the server implementing the fourth change request, the implementation of the fourth change request resulting in the network port having a fourth as-built configuration; and the server sending a message to each of the first service requester, the second service requester, and the third service requester, the message describing the fourth as-built configuration and further describing the chronology of changes made to the network port in fulfilling the first change request, the third change request, and the fourth change request.

16. The method of claim 15, wherein the chronology of changes made to the network port provide one of full and partial descriptions of at least one of the first as-built configuration, the second as-built configuration, the third as-built configuration, and the fourth as-built configuration.

17. The method of claim 15, wherein when a service requester submits a change request, one of a full and partial description of outstanding change requests regarding the subject network port is presented to the service requester.

18. The method of claim 15, wherein the determination of at least one of the importance and the order of execution of change requests is based on at least one of the severity of a problem to be addressed by a change request and the cost of implementing the change request.

19. The method of claim 15, further comprising providing change request forms to the first service requester, the second service requester, and the third service requester, the change request forms containing at least one of as-built configuration information and fields populated with information specific to each of the first service requester, the second service requester, and the third service requester.

20. The method of claim 19, wherein the information populated into the fields comprises at least one of information identifying one of the first service requester, the second service requester, and the third service requester and information about the network port, the information provided about the network port based on at least one of the permission levels of one of the first service requester, the second service requester, and the third service requester and policies regarding the network port.

\* \* \* \* \*